United States Patent
Ng

(10) Patent No.: US 6,681,285 B1
(45) Date of Patent: Jan. 20, 2004

(54) MEMORY CONTROLLER AND INTERFACE

(75) Inventor: Arthur Y. Ng, Waltham, MA (US)

(73) Assignee: Index Systems, Inc., Tortola (VG)

( * ) Notice: Subject to any disclaimer, the term of this patent is extended or adjusted under 35 U.S.C. 154(b) by 322 days.

(21) Appl. No.: 09/626,464

(22) Filed: Jul. 26, 2000

Related U.S. Application Data
(60) Provisional application No. 60/144,995, filed on Jul. 22, 1999.

(51) Int. Cl.[7] .......................... G06F 13/36; G06F 13/28; H04N 9/64
(52) U.S. Cl. .......................... 710/309; 710/244; 710/35; 348/718
(58) Field of Search .......................... 710/38, 240–244, 710/305, 306, 309, 311, 313–317, 35; 711/1–5, 147–153, 210, 211; 348/565, 567, 714, 718, 478

(56) References Cited

U.S. PATENT DOCUMENTS

| | | | | |
|---|---|---|---|---|
| 4,384,323 A | * | 5/1983 | Ahuja .......................... | 710/241 |
| 4,604,683 A | * | 8/1986 | Russ et al. .................... | 710/100 |
| 4,991,112 A | | 2/1991 | Callemyn ...................... | 364/518 |
| 5,530,955 A | * | 6/1996 | Kaneko ........................ | 711/104 |
| 5,737,030 A | * | 4/1998 | Hong et al. .................... | 725/41 |
| 5,889,981 A | * | 3/1999 | Betker et al. ................... | 712/227 |
| 5,983,315 A | * | 11/1999 | Larky et al. ................... | 711/109 |
| 6,006,303 A | | 12/1999 | Barnaby et al. ................. | 710/244 |
| 6,247,084 B1 | * | 6/2001 | Apostol et al. ................. | 710/108 |
| 6,397,386 B1 | * | 5/2002 | O'Connor et al. ............... | 725/39 |
| 6,519,666 B1 | * | 2/2003 | Azevedo et al. ................. | 710/120 |
| 6,522,694 B1 | * | 2/2003 | Ryan .......................... | 375/240.25 |

FOREIGN PATENT DOCUMENTS

| | | |
|---|---|---|
| EP | 0 322 065 | 6/1989 |
| EP | 0 691 616 | 1/1996 |

* cited by examiner

Primary Examiner—Glenn A. Auve
Assistant Examiner—Trisha Vu
(74) Attorney, Agent, or Firm—Christie, Parker & Hale, LLP

(57) ABSTRACT

A memory controller is provided that has an access priority arbiter having a memory address bus and a memory data bus for connection with one or more memories and a plurality of requester buses, each for connection to a memory requester. It also has a RAM controller for connection with a RAM connected to the memory data and address buses and/or a ROM controller for connection with a ROM connected to the memory data and address buses. Each such RAM controller and/or ROM controller are connected to the access priority arbiter with one or more control lines. The access priority arbiter receives access requests on one or more of the requester buses and grants access to the memory address and data bus to one requester bus at any one time based on logic internal to the access priority arbiter.

31 Claims, 3 Drawing Sheets

MEMORY CONTROLLER AND INTERFACE

CROSS-REFERENCE TO RELATED APPLICATIONS

This application claims the benefit of the filing date of U.S. Provisional Application No. 60/144,995, filed July 22, 1999.

FIELD OF THE INVENTION

The present invention relates generally to a memory controller architecture, and more particularly to a processor to memory interface and a memory controller within an electronic program guide (EPG) system.

BACKGROUND OF THE INVENTION

One design of memory controllers for allowing access by multiple devices to common memories utilizes the Advanced Microcontroller Bus Architecture (AMBA) Advanced System Bus (ASB). The ASB utilizes multiple access operation. A simplified memory management controller that allows multiple device to access common memories without requiring the use of multiple access operation of the type used by AMBA would be beneficial.

SUMMARY OF THE INVENTION

A memory controller is provided that has an access priority arbiter having a memory address bus and a memory data bus for connection with one or more memories and a plurality of requester buses, each for connection to a memory requester. It also has a RAM controller for connection with a RAM connected to the memory data and address buses and/or a ROM controller for connection with a ROM connected to the memory data and address buses. Each such RAM controller and/or ROM controller are connected to the access priority arbiter with one or more control lines. The access priority arbiter receives access requests on one or more of the requester buses and grants access to the memory address and data bus to one requester bus at any one time based on logic internal to the access priority arbiter.

DETAILED DESCRIPTION OF THE INVENTION

U.S. patent application Ser. No. 09/120,488, Systems and Methods for Displaying and Recording Control Interface with Television Programs Video Advertising Information and Program Scheduling Information, and International patent application number PCT/US98/15093, Systems and Methods for Displaying and Recording Control Interface with Television Programs Video Advertising Information, is hereby incorporated by reference as if set forth herein in its entirety.

Figure 1:
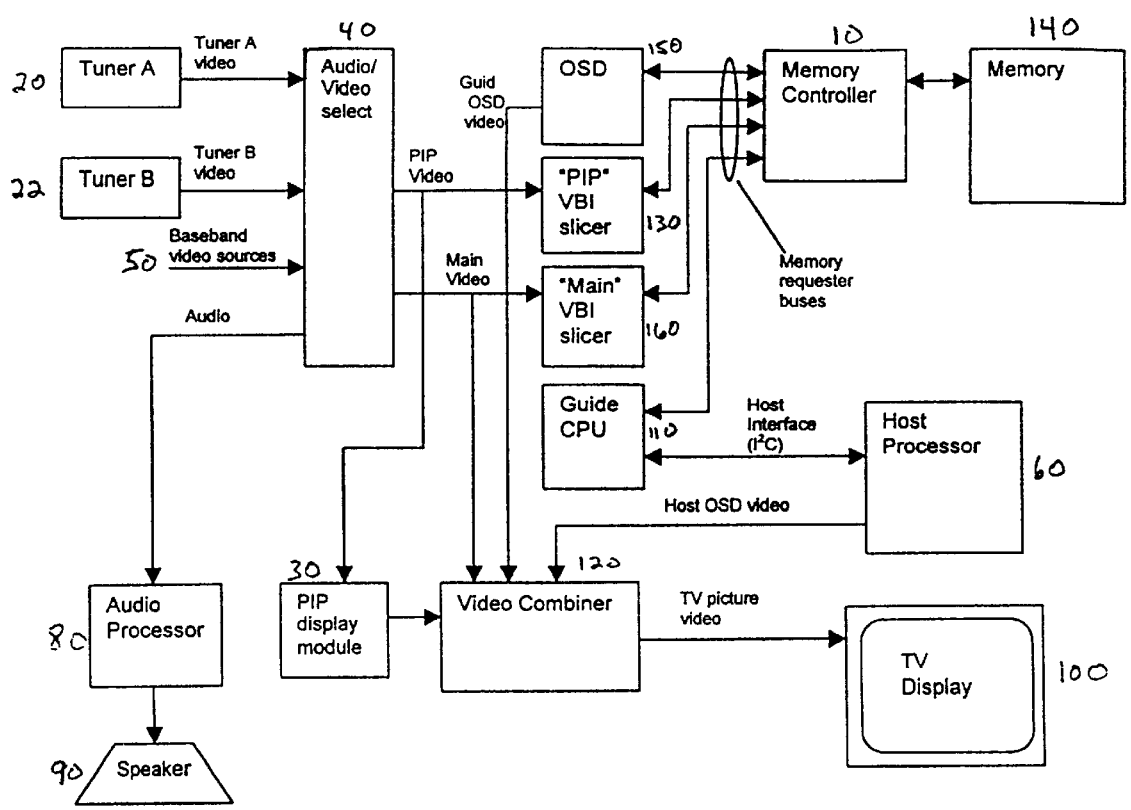
FIG. 1 is a block diagram of a television incorporating an electronic program guide and a preferred embodiment of the invention.

The preferred embodiment of the invention exists in an electronic program guide (EPG) system. FIG. 1 is an overall system diagram of a television incorporating an EPG. FIG. 1 depicts a typical television equipped with an EPG including a memory controller 10 that is the subject of the invention.

Television signals that have been modulated onto designated channels in the RF are received on either Tuner A 20 or Tuner B 22. Two tuners are shown but a reasonable system can be constructed with only one tuner. Multiple tuners allow a television equipped with a special PIP Display Module 30 to provide a picture-in-picture service (PIP) which is often used to monitor alternate channels of programming in a small portion of the screen while watching a program on a main channel on the larger portion of the screen. The PIP display module performs horizontal and vertical scaling of the picture to typically ⅛ or ¹⁄₁₆ of the original area of the source video and provides that reduced size picture for inclusion on top of the main picture at the position requested.

The Audio/Video Select box 40 selects a video and audio source for user viewing and a video source for the PIP. The video sources are the tuner input(s) and, if available, baseband video inputs 50 from external sources such as a VCR. The selection is made under control of the Host Processor 60, which is a master control processor for the entire television set. The Host Processor, through an appropriate control mechanism (generally the industry standard I2C bus 70), also makes channel change requests of the tuners; controls the Audio Processor 80, which determines the speaker 90 volume; controls picture quality of the TV Display 100; controls whether the PIP is displayed and on what portion of the screen it should overlay; and interacts with the Guide CPU 110, which is the controller of the EPG. The Host Processor and the Guide CPU can be the same device. The Host Processor optionally provides for the generation of certain On-Screen Display (OSD) graphics such as menuing systems or closed-caption text. Alternatively, these OSD functions may be provided as an adjunct service of the EPG. A final Video Combiner 120 unites the main video picture, PIP display, Guide OSD, and Host OSD into a final picture for display on the TV Display.

The EPG receives program information and ancillary information from data encoded onto scan lines of the Vertical Blanking Interval (VBI) of the television signals generated by stations within a data distribution network. A basic EPG needs only one data channel to perform its functions, but the EPG system shown in FIG. 1 receives two video feeds, one from Tuner A and one from Tuner B. In the case of a system with two tuners, the first tuner is normally the main channel that is being watched actively by the user. The EPG system scans the main channel VBI for closed caption and Extended Data Services (XDS), which is used for the parental lockout function. The EPG system also scans the main channel VBI for EPG data if it happens to have any. The second tuner is for the PIP if the user calls for a PIP, and the rest of the time it is the main source of EPG data.

If a station television signal contains VBI data, there is nothing to preclude decoding the data even when the PIP is in use. The PIP VBI slicer 130 is a circuit capable of decoding the data from encoded lines of the VBI and depositing it in a specified area of RAM (a "buffer") by direct memory access (DMA) The PIP VBI slicer requests and obtains control of the memory 140 bus via the Memory Controller.

The Guide CPU 110 executes instructions contained in ROM. As one of its main tasks, the Guide CPU processes the decoded data, which was deposited in RAM by a VBI slicer. From the decoded data, the Guide CPU creates local databases appropriate to the particular television and its users. The Guide CPU extracts appropriate portions of data from the VBI data feed (stream of data encoded in the VBI representing program information and ancillary information) according to user defined criteria (e.g. postal code, cable vs. over-the-air, cable company's identity). These databases are stored in RAM.

The Guide CPU reacts to indications of Guide-related remote control button depressions sent to it by the Host Processor. Upon indications that the user wants to see a Guide screen, the Guide CPU creates a display list with associated bitmap data in memory and causes it to be displayed by activating an OSD block. Activating an OSD block causes display commands and data to be read from memory by DMA and the final picture is delivered to the video combiner. The Guide OSD 150 fills the display except for a PIP in one portion of the screen that continues to show the program the user is watching or a user selected channel. The user selects a channel via an EPG Graphical User Interface (GUI).

Legislation has mandated a parental lock-out capability subject to password control and viewing criteria (so-called "VChip" functions) and provides for the inclusion of closed-caption text features to enable hearing impaired viewers to follow spoken dialogue, narration, etc. Data for both of these functions are encoded in the VBI and can be decoded by circuitry similar to that required for EPG functions. In North America, where National Television Standards Committee (NTSC) video is widely employed, Closed Caption and Extended Data Services (XDS) are encoded on line 21 of a television field. The Main Video data slicer 160 can be programmed by the Guide CPU to decode this data and deposit it in a specified buffer in RAM by DMA, similar to what the PIP slicer does. In television sets in which the EPG is used to provide closed caption subtitles, the EPG GUI is used to overlay such text on top of the main video display. In conjunction with user set criteria for parental control, the Guide can lock out access to a particular program when it compares the XDS information on the program against its data base. The EPG can also prevent the selection of inappropriate programming via the Guide's GUI using advance information of content provided in the EPG's data feed. Direct monitoring of the main video XDS supplements this function by preventing the override of the protection function by, for example, manual retuning of a cable set top box.

Figure 2:
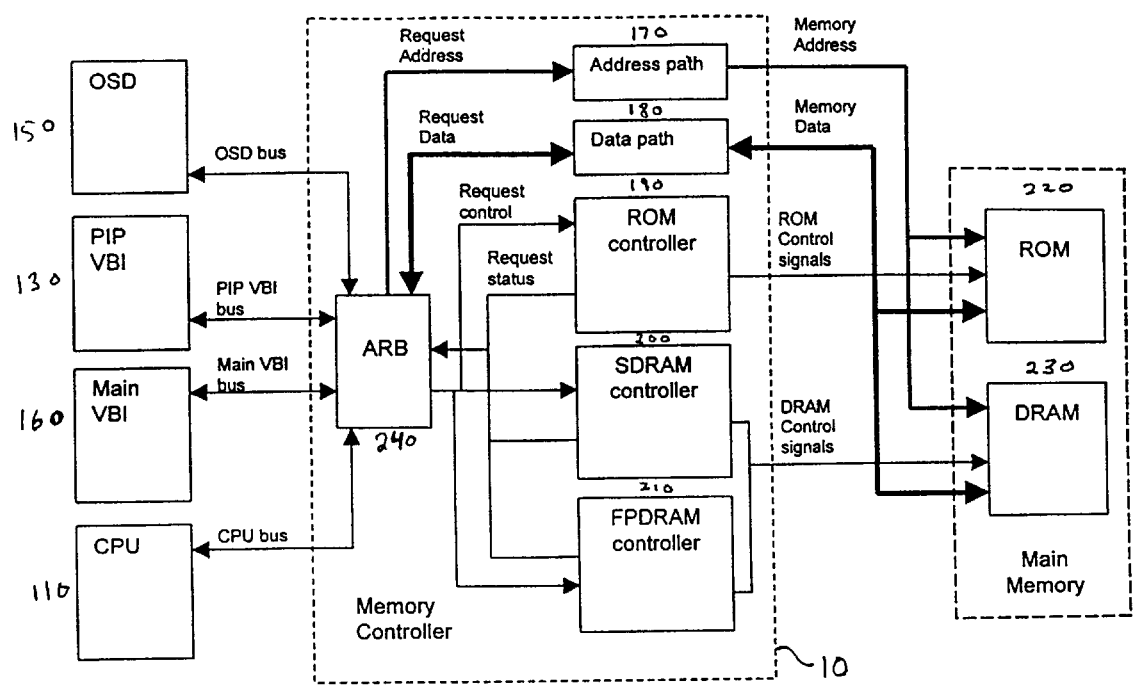
FIG. 2 is a block diagram of a subsection of the television shown in FIG. 1 that includes a memory controller according to one embodiment of the invention.

FIG. 2 is a simplified block diagram of a subsection of television circuitry illustrating the memory controller architecture of a preferred embodiment of the invention. It includes the memory controller and the devices it interfaces with. FIG. 2 shows the memory controller proper standing between the four memory-accessing controllers (CPU, OSD, Main VBI, and PIP VBI) and the memory arrays (ROM, DRAM). The four memory-accessing controllers are each interfaced to the memory controller via a separate port.

The memory controller takes memory requests from multiple sources and makes sure that no two different memory requesters hold the memory bus at the same time. In the preferred embodiment of the invention, the modules requesting access to memory via the memory controller are the OSD, the two VBI data slicers, and the Guide CPU (collectively referred to as memory requesters).

The OSD processor module, the VBI modules, and the CPU are also called requesters because they request access to the memory controller. They are also called bus masters and controllers because they are able to be masters of the main Memory Bus, the bus of the external memory devices. The VBI modules are also called data slicers because they slice, i.e., extract, VBI data from a video signal.

The memory controller arbitrates access to memory and determines which of the memory requesters shall be given access. The Memory Controller contains at least a ROM access controller and a RAM access controller. In the preferred embodiment, the memory requesters can provide advance information of the number of consecutive memory locations that they need to access in the form of a burst count. The Memory Controller decrements this number to zero as it processes the request while it increases the address starting from the initial address provided by the requester. The automatic increment of the address in the memory controller allows the memory requesters to be simplified in that they do not have to have the duplicate function of an address incrementer. Not all memory requesters necessarily know in advance how many consecutive locations are required, but a persistent request for one access with an increasing address has the same effect.

The ROM and RAM access controllers share an address path and data path but otherwise they are separate finite state machines. The ROM and RAM access controllers can be typical implementations that are well known to those of ordinary skill in the art and will not be described in detail here.

The memory controller proper is comprised of the Address Path module 170, Data Path module 180, Read-Only Memory (ROM) Control module 190, Synchronous Dynamic Random Access Memory (SDRAM) Control module 200, and Fast-Page Dynamic RAM (FP DRAM) Control module 210. External to the memory controller proper are the On-Screen Display (OSD) processor module 150, Picture-InPicture Vertical Blanking Interval (PIP VBI) module 130, Main Vertical Blanking Interval (VBI) module 160, Central Processing Unit (CPU) 110, Read-Only Memory (ROM) 220, and Dynamic Random Access Memory (DRAM) 230. There are certain peripheral interfaces to and from the television circuitry of FIG. 2 that are not shown in FIG. 2 such as peripherals to receive data from composite video inputs, to synchronize timing with a video display, and to put out a display.

The OSD 150 is a subsystem for displaying graphics. It is used for the display of TV menus, program guide, closed caption and other graphical objects. The OSD Controller is responsible for requesting OSD control and display data from the memory controller. It obtains its information from DRAM by direct memory access. The VBI modules are Vertical Blanking Interval data processors. The Main 160 and PIP 130 VBI data modules are identical. They receive a video signal from a television tuner module at baseband (independently tuned) and attempt to retrieve/decode data encoded on certain scan lines in the vertical blanking interval. The distinction between the two is the kind of input they receive and how the VBI modules are used. The two VBI data modules get their names from the kind of input they receive. "Main" refers to the channel being watched. The Main VBI data module usually receives its input from a first and main tuner which is used to tune a television to the channel to be watched. The PIP data module usually receives its input from a second tuner which is ordinarily used for the PIP function. The Main VBI data module 160 processes data for the main picture and is important for acquiring Closed Caption data and Extended Data Services (XDS) for parental control functions. The PIP VBI data module 130 is a bit of a misnomer. It really relates to the Guide Data channel from which guide databases are derived.

The Guide Data channel is sometimes via the first tuner, but is ordinarily via the second tuner in order to keep the Guide Data channel independent of the channel being watched. Given two tuners, when the PIP function is not turned on, the second tuner is available for data services even while someone is watching the television. In addition, data can be acquired from the channel being watched even while acquiring data from a channel not being watched. These modules receive instructions on which lines to scan from DRAM and write data to DRAM by direct memory access.

The CPU 110 is the main control element of the electronic program guide. The CPU is either a slave of the television's host microcontroller (they communicate by serial communications bus) or is itself the central television controller and the electronic program guide function is one of its subfunctions.

The ARB 240 is an access priority arbiter, which decides which of the multiple masters should obtain control of the memory controller at the next free cycle. The ARB ensures that only one requester at a time is allowed to initiate data transfers. In a preferred embodiment of the invention, the ARB does not attempt to equalize access among the OSD, PIP VBI, Main VBI, and the CPU. In a preferred embodiment of the invention, the ARB has a set priority scheme in which the OSD has highest priority, the two VBI controllers come next (with priority between the two assigned arbitrarily at design time), and finally the CPU has lowest priority. The CPU is ordinarily granted access by default since it is the lowest priority requester in the arbitration chain. The ARB is not so much a processor as a priority encoder with memory to remember which module was granted access.

FPDRAM is Fast-Page Dynamic RAM, the usual sort of dynamic RAM sold since the late 1970s. It has a close relative called Extended Data Output (EDO) DRAM, a memory design that holds its data valid after a read instead of three-stating the data lines when the column address strobe goes inactive. The FPDRAM controller 210 supports both memory techniques.

The Synchronous DRAM (SDRAM) controller 200 implements the access control method for Synchronous DRAMs, a particular type of DRAM that has a clocked (synchronous) control interface. The FPDRAM controller implements the access method for fast page DRAMs. Both controllers, SDRAM control and FPDRAM control, are finite state machines that sequence through a set of states as required to perform the required functions. In the SDRAM interface, the usual control lines of RAS, CAS, and MWE are encoded to form commands to the SDRAM that are committed to the chip at the rising edge of a clock. In the FPDRAM interface, the level of these signals and the order in which they are asserted has continuous significance to the FPDRAM—a change to any of these signals is a change of state of the access control. The ROM controller 190 controls both RAM and ROM. The Address path module 170 is used to determine the address of a read/write from/to memory. The Data path module 180 is used to read/write data from/to memory.

The CPU bus in one embodiment of the invention is an Advanced Microcontroller Bus Architecture (AMBA) Advanced System Bus (ASB) as described in the AMBA specification Revision D (available from Advanced RISC Machines (ARM) Ltd.) which is hereby incorporated by reference as if set forth herein in its entirety. The ASB is capable of multiple access operation but the AMBA arbitration method is not implemented in this embodiment, preferring to regulate access of memory by the CPU by the use of wait states. When another requester has memory access, the CPU gets wait stated. The CPU waits for memory access until all higher priority requesters have no pending requests. To the CPU, the memory appears to be slow when another requester has memory access.

A desirable result of the invention is to provide a simple method for many controllers to gain access to an external memory controller without having to implement the multiple access method such as the one prescribed in the AMBA specification. Using the invention's method of accessing memory simplifies memory access, whereas following the AMBA specification for all of the controllers is more complicated than the invention's method of accessing memory. Arbitration of which memory requester obtains access is done within the memory controller instead of outside of the memory controller. The advantage of having the arbitration done within the memory controller is that the whole operation of granting access to the memory controller is encapsulated inside the memory controller. Consequently, the design of the individual requester, other than the CPU, is simplified because the requesters do not have any processing requirements for bus arbitration other than requesting a number of memory accesses. Whereas, if the normal convention of interfacing alternate bus controllers to the ARM system bus was followed, each of them would have had the AMBA system interface and would be identical to the ARM processor's bus interface and would be regulated by an AMBA arbiter. The AMBA arbiter would have been on the outside of the memory controller and would involve a bus hand-over-like mechanism, such as a bus-request/bus-grant mechanism. The memory controller arbitration implemented in the current embodiment avoids using the ARM processor's multiple master interface.

In a simple embodiment of the invention, access to the memory controller is priortized from the top of FIG. 2 (OSD) to the bottom of FIG. 2 (CPU). The OSD has the highest priority for accessing the memory controller; the PIP VBI has the second highest priority for accessing the memory controller; the Main VBI has the third highest priority for accessing the memory controller; and the CPU has the lowest priority for accessing the memory controller. The arbitration algorithm of the embodiment described can be summarized as follows:

if OSD request is asserted, OSD is granted next
    else if PIP VBI request is asserted, PIP VBI is granted next
    else if Main VBI request is asserted, Main VBI is granted next
    else if CPU request is asserted, CPU is granted next There is no attempt to enforce a fairness policy or to ensure that a lower priority requester obtains at least a little time if it has been waiting a long time. Conceivably, the CPU could starve for attention in its position on the bottom of the priority scheme; however the CPU does not starve for memory access because the OSD and VBI controllers are designed to request a limited number of memory accesses whereby the CPU is guaranteed to eventually obtain memory access. Other prioritization schemes are available and will work well in the invention.

An advantage of the preferred embodiment of the invention is that the OSD and VBI requesters provide predetermined burst counts which the memory controller can process, and though the CPU has no capability of supplying such a burst count, it is treated as if it always requests a single access. A burst count is the number of memory accesses that a requester is requesting of the memory controller, that is, a burst count is a count of memory accesses of a given size in bytes that is requested (Burst count times size in bytes equals total bytes requested). The ability to provide a burst count provides predictable total access duration which can be used by the designer of the memory controller to control the arbitration algorithm such as by temporarily altering priorities to allow a very short request to take place before a much longer request made by a normally higher priority requester in order to minimize total wait time, or by suspending a long access in progress in order to accept a very short request before resuming the longer access.

The method of providing pre-determined burst counts is implemented by having the requesters supply a starting address, a direction of the transfer (read or write), a width of the transferred object (byte, word, etc.), and a count of the number of accesses. Once the memory controller acknowledges a request, the memory controller has all the address and control information it requires to complete the burst access (the requester has to continue to supply data to be written for a write burst). This method presumes that the requester knows in advance how many consecutive memory objects it requires to transfer (this is often the case for a cache memory system which needs to fill a cache line with typically four words). In the case of the OSD and VBI modules, the transfer counts are a matter of what state the machine is in and therefore the transfer counts are predictable. A possible application of supplying a transfer count would be to assist an intelligent arbiter in scheduling access to the bus. For example, unlike a fixed scheme, an arbiter might let through a one-word request from one requester in front of a 16-word request from another requester because it will minimize total wait time aggregated among all requesters. Another application would be predictable wait time so that a fixed but programmable priority scheme could be adjusted if the wait time would cause a system error.

Another advantage of the preferred embodiment of the invention is that the VBI slicers have been given direct access to main memory. In previous and other chip designs, the VBI slicers are peripherals of the main processor (CPU) and either interrupted the processor when they had new data available or they were polled by the CPU to deliver their data. Such systems typically contained a limited amount of temporary storage for VBI data to be held pending the CPU's reading the data and transferring it to a designated area of main memory. Occasionally, the CPU will be busy executing critical code from which it cannot be interrupted, allowing insufficient time to read the data from the VBI slicer before newer data supplants the still unread data. This is a problem of insufficient latency, which is defined as available slack time to accomplish a necessary task (in this case, transferring the VBI data before said data is overwritten).

In the preferred embodiment of the invention, the VBI slicers are designed as programmable direct memory access (DMA) controllers which are capable of requesting access to the main memory bus for the purpose of depositing new data in a designated area of main memory. The principal advantage of such a method is that the latency requirements for the CPU to examine the data are greatly relaxed when the data are deposited in main memory. In previous systems, the CPU had only as much time as was available between the last byte of VBI data of one scan line and the first byte of VBI data of the next scan line to access the VBI slicer in order for the VBI slicer to take the data and transfer it to a designated area of main memory for further analysis. Depending on the size of the main memory buffer, up to several seconds worth of VBI data could be accumulated before requiring the attention of the CPU in order to prevent overflow of the main memory buffer.

Figure 3:
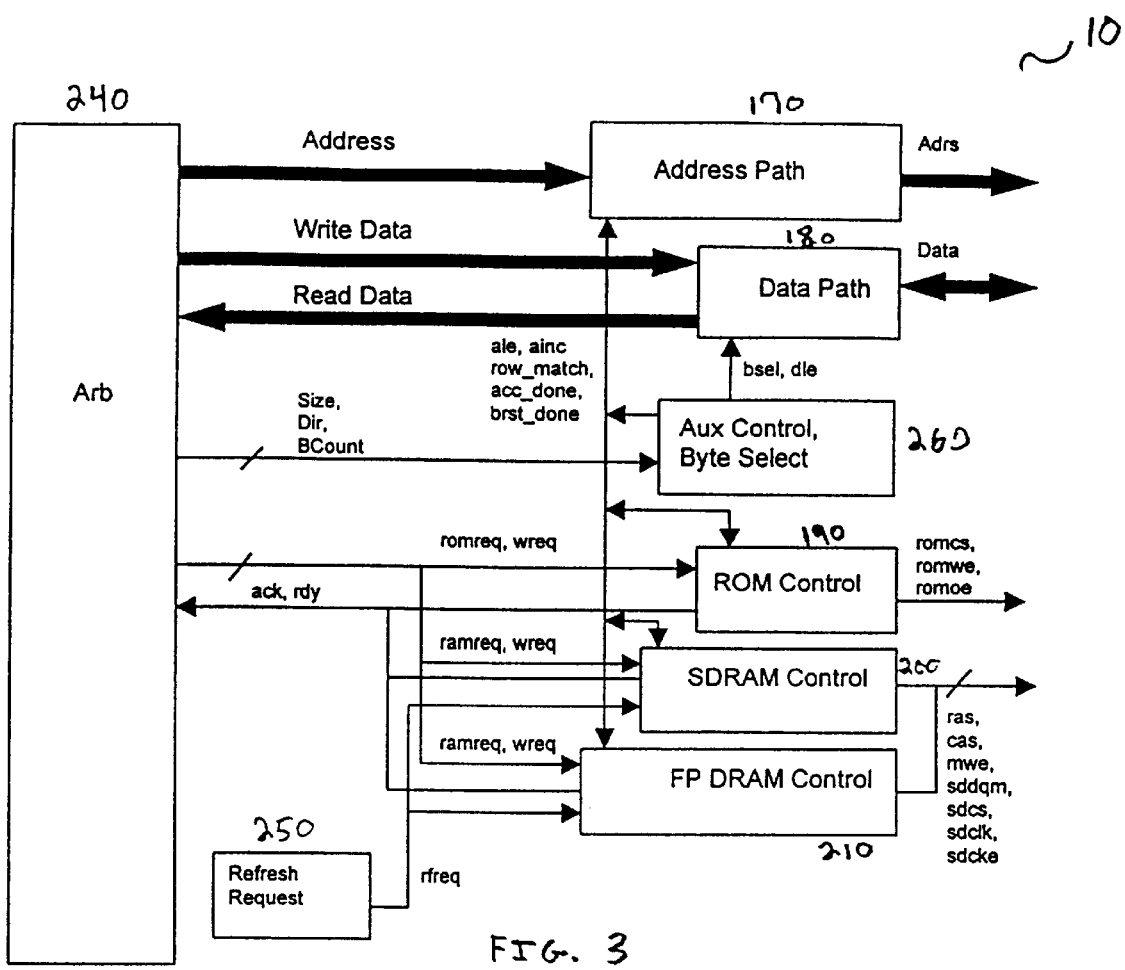
FIG. 3 is a block diagram of the a memory controller according to one embodiment of the invention.

FIG. 3 provides more detail of the memory controller interior. The ARB 240 decides which of the four sources, i.e., which of the four requesters (OSD, PIP VBI, Main VBI, or CPU), has won the right to control the memory controller bus. The memory controller bus is comprised of the enlarged paths shown in FIG. 3, i.e., the address path, write data path, and the read data path. A new contest is held every clock cycle, but control passes only when the bus is free or the current owner is on its last access. The Address path module 170 generates the multiplexed DRAM address, saves the current open DRAM rows for comparison, and maintains the address counter to support burst accesses to consecutive addresses. The Data path module 180 steers bytes for the outbound and inbound data buses to assure proper data positioning and latches outbound and inbound data to assure proper timing for memory data transfers. The Refresh Request block 250 regulates the DRAM refresh process. The Refresh Request block generates a regular DRAM refresh request. The regular refreshes are required by the DRAM for proper data retention.

The Aux Control/Byte Select module 260 maintains a counter for sub-accesses (intermediate accesses to fill out an access request that is wider than the physical device), burst accesses (the number of consecutive locations required is decremented to zero), and byte decode logic to control the Data Path byte steering.

ROM Control 190, SDRAM Control 200, and FP DRAM Control 210 are finite state machines with synchronous control outputs. The SDRAM and FP DRAM control machines are mutually exclusive; a configuration bit chooses which of the two is active.

Access can include multiple accesses in a burst to consecutive memory addresses. A requester can assert its request on the memory controller and have uninterrupted access for multiple memory cycles for as many memory cycles that it needs. In another embodiment of the invention, memory requesters are designed to limit the number of consecutive accesses that they may request to a specified number, such as eight accesses, to try to prevent the memory controller from starving the other memory requesters. Given the limit on memory accesses, the memory controller does not have to try to make intelligent decisions in the memory controller about which memory requester should get access. Other systems may grant memory access to a requester which only needs a single-cycle access to memory, and thereafter continue with its priority scheme. However, in the preferred embodiment of the invention, the memory controller has an upper limit on access size. Whichever requester is accessing the memory bus gets priority over all of the other requesters and is expected to relinquish the bus once it does not need the memory bus. This is a simplification made in the design of the memory controller made possible by a restriction in the design of the alternate memory requesters.

Normally, in the control scheme of the present invention, a single burst access request of count N is accepted by the memory controller when it returns an access acknowledge signal (ACK). If the requester needs to access even more data after these N accesses, it could keep its request asserted and may continue to have memory bus access. A requester can be "friendly" to the other requesters and rescind its request upon the acknowledgement—the N accesses of the burst are still going to be made for it and then the memory bus will be free. However, a requester can be unfriendly to the other requesters and continue to have memory bus access, and therefore the requester will retain control of the bus if there are only lower priority requesters vying for the bus, but will lose control of the bus to a higher priority requester at the completion of the N accesses of the burst.

The memory controller is three controllers in one: ROM Controller 190, SDRAM Controller 200, and FPDRAM Controller 210. The synchronous DRAM controller and the fast page DRAM controller are mutually exclusive. They share a configuration register. An application uses either one of the DRAM controllers. There are different timing fields that are supplied in the configuration register for how many cycles of wait states to do in different states of the access. The SDRAM controller and the FPDRAM controller are two different controllers and they stay out of each other's way.

The ROM controller 190 is actually a ROM/SRAM (Static RAM) controller for accessing traditional static RAM or read only memory devices, wherein access is made upon presentation of an address and assertion of a chip select signal. The ROM controller gets an address and reads back data without having to sequence com access strobes or the equivalent. Write access to static RAM is also made by assertion of a write enable signal and output data with conforming timing. The conventional static RAM and ROM have a similar access method except that ROMs are read only devices and would ignore any attempt to write to them. Several common peripheral devices such as serial chips have compatible interfaces and would also be accessed through the ROM controller.

The ROM controller is designed so that if a refresh cycle to the DRAM is needed (either of the two DRAM types, SDRAM or FPDRAM), the DRAM can be refreshed while accessing the ROM. Thus, it is not necessary to suspend ROM activity while refreshing the DRAM since refreshing the DRAM does not require the use of the address or data buses.

The ROM memory controller is designed so that the size of the device width can be programmed. Consequently, a 16 bit wide DRAM or a 32 bit wide DRAM array could be attached to the chip and has logic that executes the correct number of cycles to fill out the requested memory object. Thus, if a 32-bit word is to be written to a 16-bit wide DRAM, the ROM memory controller will do two consecutive write cycles to two consecutive memory addresses and the processor will only receive a single ready back. The processor does not, itself, have to break up the 32-bit word into multiple addresses. The ROM controller goes down to the byte level so that it can do four consecutive single byte accesses to fill out a 32-bit word access to an eight bit wide memory device.

The signals emerging from the ARB are really passthroughs of signals from the winning requester. That is, the aggregate of signals passing between the ARB and the memory controller modules are a memory bus equivalent to any one of the buses connecting each of the memory requesters to the ARB.

Signals from the Requester:
 Address (actually the starting address for a burst)
 Write Data (outbound data for a write access)
 Size (meaning access width—byte, half-word (16 bit), word (32 bit))
 Dir (direction—'1' to read, '0' to write)
 BCount (burst count—1 to 15 consecutive accesses)
 romreq (ROM space access request)
 ramreq (RAM space access request)
 wreq (same as Dir)

Signals to the Requester:
 Read Data (inbound data from a read access)
 ack (access request acknowledge—address, dir, bcount, etc. have been captured on local registers and the requester is free to remove the request or move on to the next request)
 rdy (data transfer ready—the write data has been written or the read data is now available)

Signals to the Memory Devices:
 Adrs (memory address, possibly from a burst counter that advances to the next higher address after the previous access completes)
 Data (bi-directional data bus)
 romcs (ROM chip select)
 romwe (ROM write enable)
 romoe (ROM output enable)
 ras (DRAM row address strobe)
 cas (DRAM column address strobe)
 mwe (DRAM write enable)
 sddqm (SDRAM data access mask—inhibits access on a byte-by-byte basis)
 sdcs (SDRAM chip select)
 sdclk (SDRAM clock—all SDRAM operations are synchronized to this clock)
 sdcke (SDRAM clock enable—must be asserted for SDRAM to pay attention to the clock)

Signals Internal to the Memory Controller:
 rfreq (refresh request—regular refreshes are required by the DRAM for proper data retention, and this regulates this process)
 ale (address latch enable—captures the address, dir, bcount, size at the next clock)
 ainc (address increment control—causes the address counter to count up by the proper amount depending on width of memory device and size of access request)
 row-match (current address matches a previous valid row address and therefore may be qualified for DRAM burst access)
 acc-done (access of a narrow memory device is complete to fulfill a request that is wider than the physical device, multiple accesses are made and this signal indicates that a sufficient number of these "sub-accesses" have been completed)
 brst-done (burst done—the memory accesses requested in Bcount have been completed)
 bsel (byte select—chooses a byte lane or set of byte lanes for steering data properly in a read or write access)
 dle (data latch enable—captures data on holding registers in concert with bsel field at completion of a read access)

The Address Path unit maintains the current access address of the external memory device, computes the next address, and performs address multiplexing for dynamic RAMs as required. The address path unit also remembers up to four current row addresses that are eligible for burst access if the current address matches an open row. (If the current address doesn't match, the DRAM controller must close down the open row of the bank that contains the target address and open the row of the target address).

The Data path contains holding registers for outbound and inbound data and contains byte-steering logic to assure that the data bytes arrive at the appropriate set of data lines of the memory device on a write or from the memory device on a read.

The Aux Control/Byte Select logic counts sub-accesses for filling out a request for memory that is wider than the external device (if necessary), counts out a multiple access burst (in our case, from 1 to 15 consecutive addresses), and computes byte selection strobes for proper steering of data based on the current address least-significant-bits (LSBs) and the access Size.

The ROM Controller is a finite state machine that governs timing and control for accessing a conventional SRAM or ROM device. Timing control fields are provided to the ROM controller from a configuration word in this embodiment, although they could also be fixed timing by design (programmable timing control is more versatile).

The SDRAM Controller is a finite state machine that governs timing and control for accessing a synchronous DRAM. The timing controls are programmable via a configuration word. The SDRAM controller also automatically configures the SDRAM for its initial setup at system start time based on the configuration word (for example, to enable burst access or to establish the access latency). The SDRAM controller also refreshes the SDRAM in response to the refresh request from the Refresh Request block. The SDRAM controller generally attempts to use burst mode access of an open row for better system performance. There can be up to two rows open simultaneously in different banks of the SDRAM in smaller SDRAM devices (e.g. 16 megabit) and up to four rows open simultaneously in different banks of the SDRAM in larger SDRAM devices (e.g. 64 megabit).

The FP DRAM Controller is a finite state machine that governs timing and control for accessing a fast page mode (FP) or extended data out (EDO) type of DRAM. The timing controls are programmable via a configuration word. The FP DRAM controller also refreshes the FP DRAM in response to the refresh request from the Refresh Request block. The FP DRAM controller generally attempts to use fast page mode burst access of a currently open row for better system performance. When this is not possible, it automatically closes the open row by precharging it and opens a new row to begin the desired access. The Refresh Request block generates a regular DRAM refresh request by dividing a 1 MHz clock by a programmed constant governing the interval between refresh requests. Typically, a minimum number of refresh accesses must be accomplished within a specified time period (e.g. 4096 refreshes within 64 milliseconds) in order to ensure proper data retention of the device. Depending on the type of DRAM, refreshes may be made in bursts (e.g. four back-to-back) or individually for better overall system performance.

What is claimed is:

1. A memory controller comprising:
   an access priority arbiter having a memory address bus and a memory data bus for connection with one or more memories and a plurality of requester buses, each for connection to a memory requester,
   one or more of a RAM controller for connection with a RAM connected to the memory data and address buses and a ROM controller for connection with a ROM connected to the memory data and address buses, wherein each such one or more of a RAM controller and a ROM controller are connected to the access priority arbiter with one or more control lines,
   wherein the access priority arbiter receives access requests on one or more of the requester buses and grants access to the memory address and data bus to one requester bus at any one time based on logic internal to the access priority arbiter, and
   wherein the access requests include burst counts and the access priority arbiter grants access as a function of the burst counts and an aggregated total wait time.

2. The memory controller of claim 1 wherein the logic internal to the access priority arbiter comprises priority logic that grants access based on discrete priority levels that are preassigned for each of the requester buses.

3. The memory controller of claim 1 further comprising an on screen display controller, a VBI decoder and a CPU, each with a requester bus connected to the access priority arbiter.

4. The memory controller of claim 3 wherein the VBI decoder acts independently of the CPU to access the one or more memories.

5. The memory controller of claim 3 wherein the VBI decoder access the one or more memories directly via the access priority arbiter and bypasses the CPU.

6. The memory controller of claim 3 wherein the VBI decoder has a higher priority level than the priority level of the CPU.

7. The memory controller of claim 3 wherein the VBI decoder is limited to a predetermined number of memory requests that is substantially less than a number of memory requests permitted by the CPU.

8. The memory controller of claim 3 wherein the on screen display controller acts independently of the CPU to access the one or more memories.

9. The memory controller of claim 3 wherein the on screen display controller access the one or more memories directly via the access priority arbiter and bypasses the CPU.

10. The memory controller of claim 3 wherein the on screen display controller has a higher priority level than the priority level of the CPU.

11. The memory controller of claim 3 wherein the on screen display controller has a higher priority level than the priority levels of the VBI decoder and the CPU.

12. The memory controller of claim 3 wherein the on screen display controller is limited to a predetermined number of memory requests that is substantially less than a number of memory requests permitted by the CPU.

13. The memory controller of claim 1 wherein the access priority arbiter grants access to a requester bus having a lower priority level than other requester buses prior to the other requester buses to minimize the aggregated total wait time.

14. The memory controller of claim 1 wherein the access priority arbiter grants access to a requester bus having a lower priority level than other requester buses, prior to the other requester buses, based on the requester bus having a low burst count.

15. The memory controller of claim 1 further comprising an address path module coupled to the memory address bus and configured to generate a multiplexed memory address, save current open memory rows for comparison, and maintains the address counter to support burst accesses to consecutive addresses.

16. The memory controller of claim 1 further comprising a data path module coupled to the memory data bus and configured to steer bytes for outbound and inbound data buses to assure proper data positioning and latches outbound and inbound data to assure proper timing for memory data transfers.

17. The memory controller of claim 1 further comprising a refresh request module coupled to the access priority arbiter and configured to regulate a memory refresh process by generating a periodic refresh request.

18. The memory controller of claim 1 further comprising an auxiliary control module coupled to the access priority arbiter and configured to maintain a counter for sub-accesses, burst access and byte decode logic to control byte steering of the memory data path.

19. The memory controller of claim 1 wherein the one or more RAM controllers are finite state machines with synchronous control outputs.

20. A memory controller comprising:
   an access priority arbiter having a memory address bus and a memory data bus for connection with one or more memories;
   a first tuner configured to receive television signals;
   a second tuner configured to receive television signals and guide data;
   a first VBI module coupled to the first tuner and having a requester bus connected to the access priority arbiter;
   a second VBI module coupled to the second tuner and having a requester bus connected to the access priority arbiter;
   a CPU with a requester bus connected to the access priority arbiter and configured to tune the first and second tuners; and
   an on screen display controller with a requester bus connected to the access priority arbiter and configured to retrieve the guide data from the one or more of the memories via the access priority arbiter to display an electronic program guide from the guide data;
   wherein the access priority arbiter receives access requests on one or more of the requester buses and grants access to the memory address and data bus to one requester bus at any one time based on logic internal to the access priority arbiter.

21. The memory controller of claim 20 wherein the logic internal to the access priority arbiter comprises priority logic that grants access based on discrete priority levels that are preassigned for each of the requester buses.

22. The memory controller of claim 21 wherein the on screen display controller has a higher priority level than the priority levels of the first and second VBI modules and the CPU.

23. The memory controller of claim 22 wherein the second VBI module has a higher priority level than the priority levels of the first VBI module and the CPU.

24. The memory controller of claim 20 wherein the access requests include burst counts and the access priority arbiter grants access as a function of the burst counts and an aggregated total wait time.

25. The memory controller of claim 24 wherein the access priority arbiter grants access to a requester bus having a lower priority level than other requester buses, prior to the other requester buses, to minimize the aggregated total wait time.

26. The memory controller of claim 24 wherein the access priority arbiter grants access to a requester bus having a lower priority level than other requester buses, prior to the other requester buses, based on the requester bus having a low burst count.

27. The memory controller of claim 20 further comprising an address path module coupled to the memory address bus and configured to generate a multiplexed memory address, save current open memory rows for comparison, and maintains the address counter to support burst accesses to consecutive addresses.

28. The memory controller of claim 20 further comprising a data path module coupled to the memory data bus and configured to steer bytes for outbound and inbound data buses to assure proper data positioning and latches outbound and inbound data to assure proper timing for memory data transfers.

29. The memory controller of claim 20 further comprising a refresh request module coupled to the access priority arbiter and configured to regulate a memory refresh process by generating a periodic refresh request.

30. The memory controller of claim 20 further comprising an auxiliary control module coupled to the access priority arbiter and configured to maintain a counter for sub-accesses, burst access and byte decode logic to control byte steering of the memory data path.

31. The memory controller of claim 20 wherein the one or more RAM controllers are finite state machines with synchronous control outputs.

* * * * *